July 12, 1927.

H. B. WATERS

VEHICLE SIGNAL

Filed April 9, 1925

INVENTOR.
Henry B. Waters
BY
Thos. J. Donnelly
ATTORNEY.

Patented July 12, 1927.

1,635,651

UNITED STATES PATENT OFFICE.

HENRY B. WATERS, OF ANN ARBOR, MICHIGAN.

VEHICLE SIGNAL.

Application filed April 9, 1925. Serial No. 21,877.

My invention relates to a new and useful improvement in a vehicle signal adapted for use particularly with automobiles such as passenger cars, trucks, etc., to be used to indicate to some extent the intentions of the driver of the vehicle. Under existing traffic regulations in most cities and in accordance with custom the driver of an automobile usually extends his hand or arm so as to project beyond the side of the vehicle to indicate to drivers of following vehicles his intentions. Such an action requires that the driver remove one hand from the steering wheel so as to render somewhat less safe the driving of the vehicle. When the driver is driving a closed car it is impossible for him to conveniently extend his arm or hand exteriorly of the vehicle beyond the side thereof. The present invention is intended to provide a mechanical means which will obviate the necessity of the driver projecting his arm beyond the side of the vehicle for giving signals.

It is the object of the present invention to provide a hand signal of this class, which will be simple in structure, economical of manufacture, and highly efficient in use.

Another object of the invention is the provision of a signal arm of this class embodying an indicator simulating a hand mounted and adapted to lie close to the side of the vehicle and to be raised into horizontal extending position at the will of the operator.

Another object of the invention is the provision of a housing for normally containing the hand and provided with a cover manipulated with the hand.

Other objects will appear hereinafter.

The invention consists in the combination and arrangement of parts hereinafter described and claimed.

The invention will be best understood from a reference to the accompanying drawings which form a part of this specification and in which, Fig. 1 is a fragmentary perspective view of the invention mounted upon a vehicle door.

Figure 1:
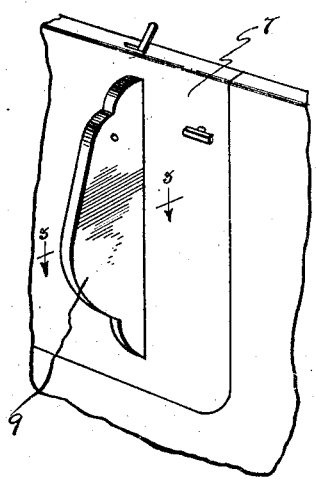
Figure 4:
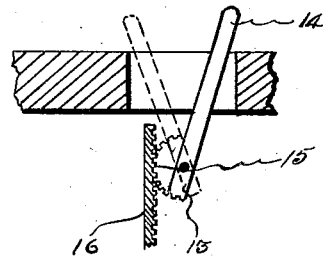
Fig. 4 is a fragmentary side elevational view of a portion of the operating mechanism.
Figure 2:
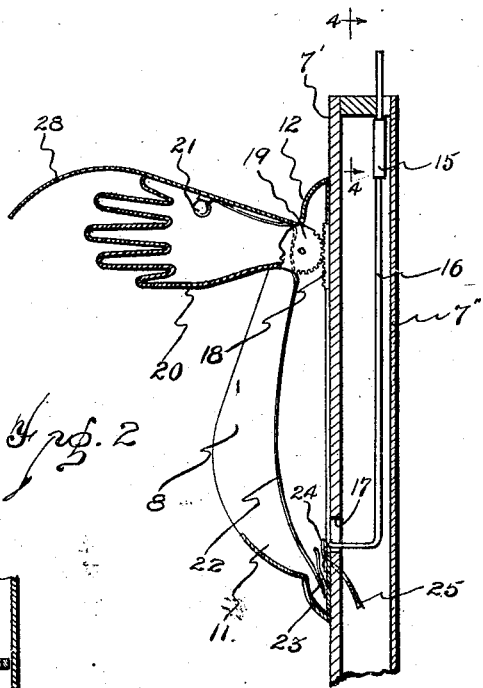
Fig. 2 is a central vertical sectional view of the invention.
Figure 3:
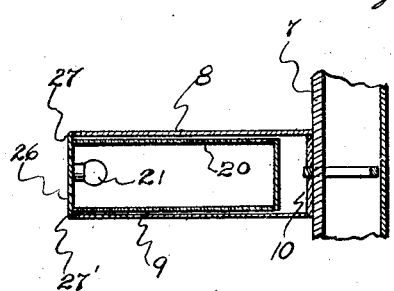
Fig. 3 is a sectional view taken on substantially line 3—3 of Fig. 1.

As shown in the drawings the invention is designed for mounting on a door 7 of the vehicle with which used and comprises a housing with side walls 8 and 9 and a rear wall 10 which are preferably formed from a single strip of sheet metal, the walls 8 and 9 being spaced apart. The rear wall is secured to the door 7 with which used by suitable fastening means such as rivets, screws or the like. As shown in Fig. 2 a tongue 11 projects from the base of the rear wall 10 and serves to form a closure for a portion of the forward part of the housing at the base thereof. A tongue 12 also projects from the rear wall 10 at the upper end thereof and serves to act as a closure for the upper portion of the housing. Mounted upon the frame of the door 7 in any desirable manner so as to be rotatable is a segment 13 having an operating handle 14 adapted to project beyond the upper edge of the door 7. The teeth of the segment 13 are adapted to mesh with teeth 15 formed on the upper end of one of the legs of the U shaped member 16, the bight of the U shaped member being projected through a slot 17 formed in the door, the other leg of the U shaped member being provided with teeth 18 adapted to mesh with the teeth on the segment 19 which is pivotedly mounted in the side walls 8 and 9 of the housing. Mounted upon the segment 19 is a housing 20 which is formed in the shape of a hand, this housing 20 being of translucent or transparent material and having an electric light bulb 21 mounted therein. The arrangement is such that upon a rocking of the segment 13, the U-shaped member will be moved downwardly of the door 7 so as to cause the hand shaped housing 20 to swing upwardly into the position shown in Fig. 2. The electric light bulb 21 is connected by suitable wiring 22 to a spring contact 23 mounted between the walls 8 and 9 adjacent the lower end thereof. An auxiliary spring contact member 24 is connected by the wiring 25 to a suitable source of electric energy and so situated that when the U member is moved downwardly so as to project the hand shaped housing 20 outwardly of its casing, the circuit of the electric light bulb 21 is closed and the hand shaped housing illuminated. When the hand shaped housing is in its normal or depending position, it is engaged between the walls 8 and 9 as shown in Fig. 3. The closing of the circuit takes place with the initial movement of the hand shaped housing 20 from between the walls 8 and 9. Mounted upon the upper side of the hand shaped housing 20 is a cover 26 having flanges 27 and 27' which project beyond the sides of the housing 20, so as to engage the edges of the walls 8 and 9 and serve as a closure for the front side of the housing comprising these walls. This cover, as shown in Fig. 2, has a forwardly projecting portion 28 which extends beyond the limits of the hand shaped housing 20 and is curved to conform to the curvature of the walls 8 and 9. The U shaped member 16 is of such a weight as to counterbalance the hand shaped housing 20, so that the housing 20 will remain in any position to which moved.

It will be noted that one of the legs of the U shaped member 16 is positioned between the walls 7' and 7" of the vehicle door and that the bight of this U shaped member is sufficiently long to permit the lying of this leg in close proximity to the wall 7". The purpose of arranging the U-shaped member with a bight of this length is to accommodate the device to use with closed car bodies in which the upper section of the window is accustomed to slide downwardly between the walls 7' and 7" of the door.

In operation the driver, when intending to signal by raising the hand shaped housing 20 into the position shown in Fig. 2, will grasp the upper end of the arm 14 and pull it toward him, thus rocking the segment and causing longitudinal movement of the U shaped member. The device, as constructed, is a compact one which, when mounted upon a car does not diminish to any great extent the lines of beauty of the car body, and in this manner there is provided a hand signal of the class which is durable in its structure, efficient in use, easily operated and quickly and easily mounted in operative position on the car with which used.

It is also apparent that the driver of the vehicle knows, at all times, whether or not the device is functioning properly.

While I have illustrated and described the preferred form of structure, I do not wish to limit myself to the precise form of structure shown, but desire to avail myself of such variations and modifications as come within the scope of the appended claim.

I claim:

A vehicle signal of the class described comprising a housing; a signal member pivotedly mounted on said housing; a segment carried by said signal member at its mounted end; a U shaped member having teeth formed on one of its legs for engaging the teeth of said segment; teeth formed on the other leg of said U shaped member adjacent the end thereof; a rockably mounted segment for engaging the teeth on said other leg for effecting longitudinal movement of said U shaped member.

In testimony whereof I have signed the foregoing specification.

HENRY B. WATERS.